(12) United States Patent
Gale

(10) Patent No.: US 9,871,787 B2
(45) Date of Patent: Jan. 16, 2018

(54) AUTHENTICATION PROCESSING FOR A PLURALITY OF SELF-ENCRYPTING STORAGE DEVICES

(71) Applicant: Assured Information Security, Inc., Rome, NY (US)

(72) Inventor: Maurice Gale, Rome, NY (US)

(73) Assignee: ASSURED INFORMATION SECURITY, INC., Rome, NY (US)

( * ) Notice: Subject to any disclaimer, the term of this patent is extended or adjusted under 35 U.S.C. 154(b) by 225 days.

(21) Appl. No.: 15/050,697

(22) Filed: Feb. 23, 2016

(65) Prior Publication Data
US 2017/0244698 A1  Aug. 24, 2017

(51) Int. Cl.
*G06F 21/00* (2013.01)
*H04L 29/06* (2006.01)

(52) U.S. Cl.
CPC ........ *H04L 63/0853* (2013.01); *H04L 63/061* (2013.01); *H04L 63/083* (2013.01)

(58) Field of Classification Search
CPC .................................................. H04L 63/0853
USPC ....................................................... 713/171
See application file for complete search history.

(56) References Cited

U.S. PATENT DOCUMENTS

| | | | | |
|---|---|---|---|---|
| 9,202,059 | B2 * | 12/2015 | Bhansali | ............... G06F 21/575 |
| 2014/0122867 | A1 * | 5/2014 | Shrinivasan | ........ H04L 63/0428 |
| | | | | 713/155 |

OTHER PUBLICATIONS

TCG Storage Security Subsystem Class: Enterprise, Trusted Computing Group, Specification Version 1.01, Revision 1.00, Aug. 5, 2015, pp. 1-83.
TCG Storage Security Subsystem Class: Opal, Trusted Computing Group, Specification Version 2.01, Revision 1.00, Aug. 5, 2015, pp. 1-80.
TCG Storage Architecture Core Specification, Trusted Computing Group, Specification Version 2.01, Revision 1.00, Aug. 5, 2015, pp. 1-306.
TCG Storage Application Note: Encrypting Drives Compliant with Opal SSC, Specification Version 1.00, Final Revision 1.00, Feb. 19, 2010, pp. 1-92.
TCG Storage Opal Integration Guidelines, Version 1.00, Revision 1.14, Aug. 17, 2015, pp. 1-20.

* cited by examiner

*Primary Examiner* — Longbit Chai
(74) *Attorney, Agent, or Firm* — Matthew M. Hulihan; Heslin Rothenberg Farley & Mesiti PC

(57) ABSTRACT

Authentication processing for a plurality of self-encrypting storage devices, e.g. SEDs) of a computer system is provided. The authentication processing for the SEDs includes obtaining authentication information for one SED of the plurality of SEDs, performing authentication processing for the one SED based on the obtained authentication information for the one SED; and based on the authentication processing for the one SED, performing authentication processing for each additional SED of one or more additional SEDs of the plurality of SEDs. A pre-boot configuration environment (PBA) to facilitate the authentication processing, and methods for installing the PBA are provided.

18 Claims, 12 Drawing Sheets

AUTHENTICATION PROCESSING FOR A PLURALITY OF SELF-ENCRYPTING STORAGE DEVICES

STATEMENT REGARDING FEDERALLY SPONSORED RESEARCH AND DEVELOPMENT

This invention is associated, in part, with government support under contract numbers FA8750-11-D-0235/0005 and FA8750-12-D-0002/0007, awarded by the United States Department of the Air Force. Accordingly, the United States Government may have certain rights in the invention.

BACKGROUND

Self-encrypting storage devices, such as self-encrypting drives (SEDs), are employed to help protect and manage sensitive data by providing hardware-based full disk encryption. SEDs incorporate cryptographic keys to encrypt data flowing in and decrypt data flowing out of the drive. SEDs are typically configured according to the Opal Security Subsystem Class Specification (herein "Opal Specification"), an open specification promulgated by the Trusted Computing Group, Beaverton, Oreg., U.S.A. A special chip is provided that encrypts data being written to the hard drive so that the data is stored to the drive as encrypted data. When data is read from the drive, the encrypted data is decrypted by the chip.

Both home and corporate computer users may wish to utilize multiple hard drives in their computer systems. However, problems exist with employing multiple SEDs in a single computer system.

BRIEF SUMMARY

Shortcomings of the prior art are overcome and additional advantages are provided through the provision of a method that includes performing authentication processing for a plurality of self-encrypting storage devices of a computer system, the authentication processing for the plurality of self-encrypting storage devices comprising: obtaining authentication information for one self-encrypting storage device of the plurality of self-encrypting storage devices; performing authentication processing for the one self-encrypting storage device based on the obtained authentication information for the one self-encrypting storage device; and based on the authentication processing for the one self-encrypting storage device, performing authentication processing for each additional self-encrypting storage device of one or more additional self-encrypting storage devices of the plurality of self-encrypting storage devices.

Further, a computer program product is provided including a non-transitory computer-readable storage medium including program instructions for execution by a processor to perform a method that includes performing authentication processing for a plurality of self-encrypting storage devices of a computer system, the authentication processing for the plurality of self-encrypting storage devices comprising: obtaining authentication information for one self-encrypting storage device of the plurality of self-encrypting storage devices; performing authentication processing for the one self-encrypting storage device based on the obtained authentication information for the one self-encrypting storage device; and based on the authentication processing for the one self-encrypting storage device, performing authentication processing for each additional self-encrypting storage device of one or more additional self-encrypting storage devices of the plurality of self-encrypting storage devices.

Yet further, a computer system is provided that is configured to perform a method that includes: performing authentication processing for a plurality of self-encrypting storage devices of a computer system, the authentication processing for the plurality of self-encrypting storage devices comprising: obtaining authentication information for one self-encrypting storage device of the plurality of self-encrypting storage devices; performing authentication processing for the one self-encrypting storage device based on the obtained authentication information for the one self-encrypting storage device; and based on the authentication processing for the one self-encrypting storage device, performing authentication processing for each additional self-encrypting storage device of one or more additional self-encrypting storage devices of the plurality of self-encrypting storage devices.

Additional features and advantages are realized through the concepts of aspects of the present invention. Other embodiments and aspects of the invention are described in detail herein and are considered a part of the claimed invention.

BRIEF DESCRIPTION OF THE DRAWINGS

Aspects of the present invention are particularly pointed out and distinctly claimed as examples in the claims at the conclusion of the specification. The foregoing and other objects, features, and advantages of aspects of the invention are apparent from the following detailed description taken in conjunction with the accompanying drawings in which:

DETAILED DESCRIPTION

Figure 1:
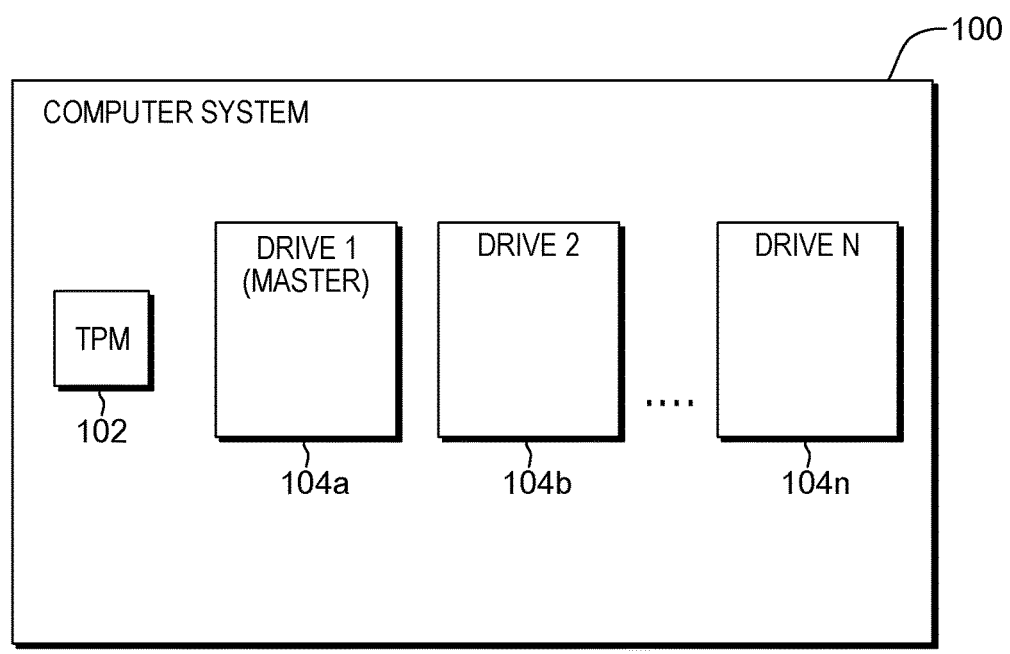
FIG. 1 depicts an example computer system comprising a plurality of self-encrypting drives.

During a typical boot scenario for a computer system that includes a single SED, the BIOS will attempt to locate and load the original Master Boot Record (MBR). A SED shadows the original MBR with its own MBR. This shadow MBR boots a pre-boot authentication environment (PBA) that is presented to a user. The user is presented with an authentication screen into which user credentials are supplied in an attempt to unlock the drive. If successful, the drive is unlocked, meaning that access to the cryptographic key(s) is granted. The data on the drive is now accessible and the operating system can boot and use the unlocked drive.

In a situation where multiple SEDs are connected in a single computer system, this typical boot sequence will not work. There is no way to unlock and manage the SEDs other than the one that shadows the original MBR. Current SED management tools support only the single drive case. There are currently no management solutions that offer concurrent multi-drive protection. Even after successfully authenticating to the particular PBA shadowing the original MBR, the other drives will stay locked. This makes it impossible, absent modifications, for the user to unlock each of the drives during the boot sequence. Even if a user installs a toolset separately on each of the drives, each drive would be part of its own system. This is equivalent to having three different systems, each with a different SED. Conventionally, there is no way to lock/unlock more than one drive using existing management tools because the tools, e.g. a PBA, can be installed only on one hard drive.

Without available management tools to manage the other SEDs, i.e. to authenticate with them and unlock their contents, they are treated as standard hard drives except that their encrypted data will not be readable.

As noted, there are situations in many environments where a single machine has multiple hard drives. In some examples, the operating system is installed on one drive and data is housed on a separate drive. Multi-drive protection described herein provides support for multiple connected self-encrypting drives in a single computer system. With this approach, users are able to authenticate to a 'master' drive and choose which of the remaining drives are to be unlocked and/or or managed. There is also support for each drive to automatically unlock once the master drive is authenticated into. Each drive can have its own set of encryption keys as well as authentication keys. The term "master" drive is used herein to refer to the drive that shadows the original MBR; it bears no relation to the master/slave relationship in parallel hard drive arrangements.

The pre-boot authentication environment (PBA) in accordance with aspects described herein controls both authentication and management of the plurality of SEDs in the system. It may be deployed on a single master drive, though optionally it could be deployed on or across several of the drives if redundancy/backup is desired.

Described herein are aspects of the installation and configuration of the PBA, as well as the processing of the PBA to provide authentication processing for the installed SEDs. Generally when the PBA is loaded and executed the user is prompted with an authentication screen and selects which, if any, additional SEDs of the computer the user desires to lock, unlock, or manage.

FIG. 1 depicts an example computer system comprising a plurality of self-encrypting drives. In particular, FIG. 1 depicts computer system 100 that includes a multi-drive system setup having a plurality of SEDs 104a, . . . , 104n. SED 104a (Drive 1) is the master drive, in this case, having the PBA according to aspects described herein installed thereon. Computer system 100 also encloses a Trusted Platform Module (TPM) 102. The TPM is used to perform the initial measurements of hardware/software of the computer system, for instance the BIOS and/or the MBR, and provide one or more values that represent a measurement of the system indicative of system integrity. In accordance with aspects described herein, the TPM measurement can be used in conjunction with a user passphrase or other authentication input to unlock one or more drives, for instance the master SED.

It should be understood that several components of computer system 100 are omitted from FIG. 1 but nevertheless present in system 100. These include processor(s), memory, and possibly additional, non-SED hard drives, among other components.

A configuration of the computer system with the PBA may be accomplished via live media, for instance by booting to a live CD or other removable-media drive, as examples. Initially, the SEDs in the system might begin as blank drives. Upon booting to the live CD, in this example, users are able to select the SEDs, of those available in the system, to be managed. Once the selected drives are verified to be SEDs, one of them is dedicated as the master drive, perhaps by way of user-selection. The master is the drive to which the PBA is written. Management tools will be installed to the remaining drives for use when separate management of the remaining drives is called for.

The selection of the drives to be included in the plurality managed by the PBA is performed as part of the configuration of the PBA. Also part of this configuration are selections by the user regarding what type of authentication is to be used for each SED. There may be various authentication types to choose from, including password/passphrase, dual password/passphrase, USB, smartcard, and/or others.

In some embodiments, an administrator authentication including a user name (e.g. 'admin') and password is initially set. Optionally a default distress/revert/wipe/erase password is set as well. Various other user accounts/authentications may be used in addition to, or in place of, the admin authentication. This may be done for each of the participating SEDs of the computer system.

The initial obtaining and setting the configuration of all authentications, their types, and their passwords/passphrases for each of the SEDs may be handled from the live CD. Thus, the first time the system runs during an initial setup, the system boots from the live CD, there is initial configuration by the user to specify authentications, authentication types, passwords/passphrases, etc., and then the PBA with initial configuration information is written to a PBA area of the master drive. Appropriate configuration can also be applied to the other SEDs as well; the management tools are run on each of the separate drives to configure them as described herein, for instance. Then, on reboot, authentication processing described herein (see FIGS. 5A and 5B) can proceed as normal.

Optionally, the first time the user authenticates successfully to a drive, the system can prompt the user to change the user's password. Thus, in a multi-drive case, for each drive, an admin authentication may be created for each drive and that authentication is drive-specific-admin1 for Drive 1, admin2 for Drive 2, etc. The first time the user, adminX, authenticates to the drive, the user may be prompted to change the password.

The live CD can write the PBA to a PBA area on the master drive. From that point, the master drive can act like a live CD for the subsequent drives and setup information in a C_PIN table for the subsequent drives using commands specified in the specification followed by the particular SEDs in use, e.g. the Opal Specification referenced above.

Figure 2:
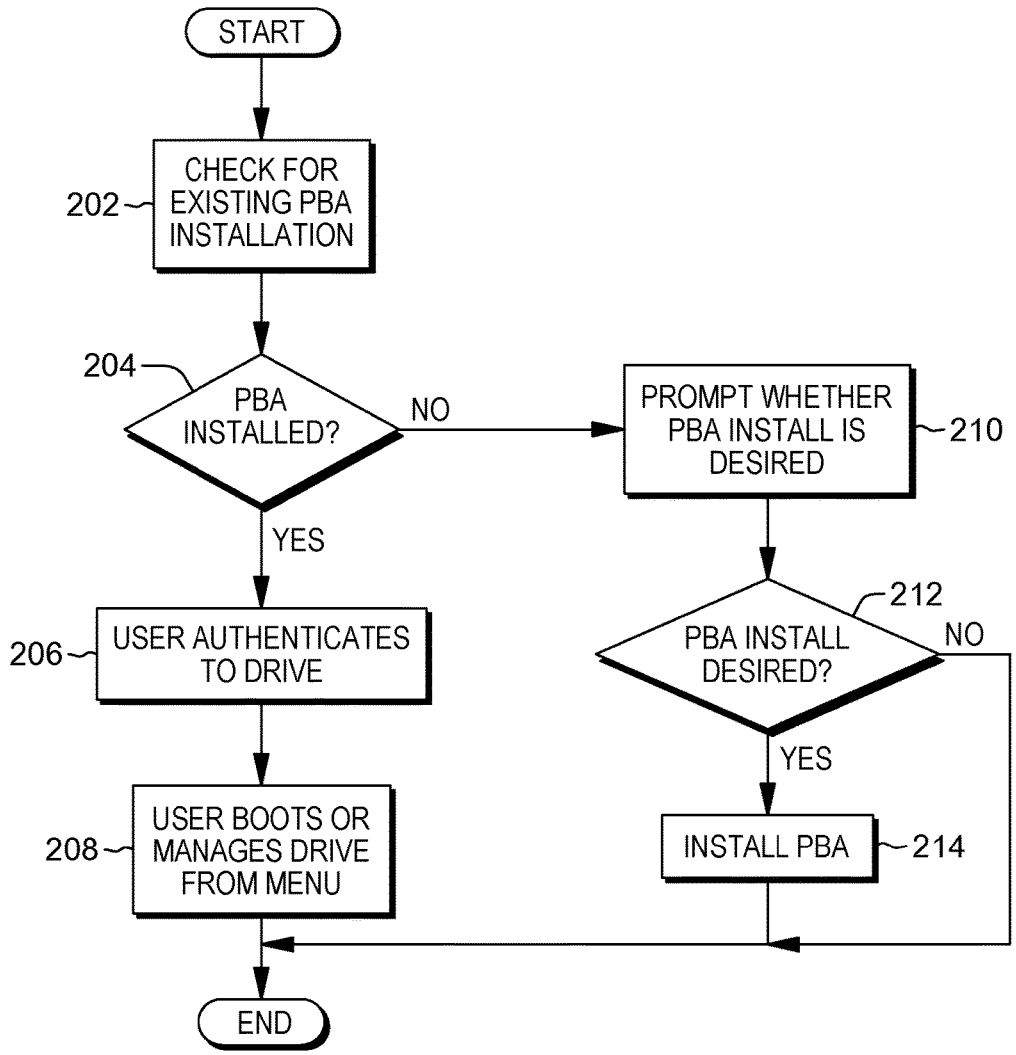
FIG. 2 depicts example pre-boot processing of live media, in accordance with aspects described herein.

FIG. 2 depicts example pre-boot processing of live media, in accordance with aspects described herein. The process begins after powering-on the computer system, which begins booting from the live CD. The processing of the live CD checks one or more SEDs for an existing PBA installation (202). It is then determined whether a PBA is already installed (204). If an installation instance of an existing PBA is detected, then the live CD presents an environment the same/similar as the PBA, where the user can authenticate to the master drive (206), then either choose to boot or manage the SEDs (208). The process at that point ends, for instance with a reboot, or other processing to facilitate managing one or more SEDs.

If instead at 204 an installation of a PBA is not detected, the used will be given the opportunity to install a PBA onto the system. The user is prompted as to whether a PBA install is desired (210). It is determined (212) whether the PBA install is desired, and, if not, the process ends (e.g. with a reboot). Otherwise, if a PBA install is desired, the PBA is installed (214), which involves soliciting information from the user including indications of the drives to be involved, authentication information such as user accounts and authentication types, and other information, and then writing to the master drive the PBA with the proper configuration information, described herein. The process then ends with a reboot, as an example.

Accordingly, the live CD has the capability of serving multiple purposes. It can be used for unlocking and booting a SED. This may be useful in a situation when the current PBA is corrupted or inaccessible. The live CD can also be used to manage a SED, providing some or all of the management features such as adding users, deleting users, modifying authentication information, etc. that are typically available within a standard PBA. Additionally, the CD can also be used to install a PBA onto the system, including initially installing the PBA, as well as re-writing, patching, or updating an installed PBA.

Figure 3A:
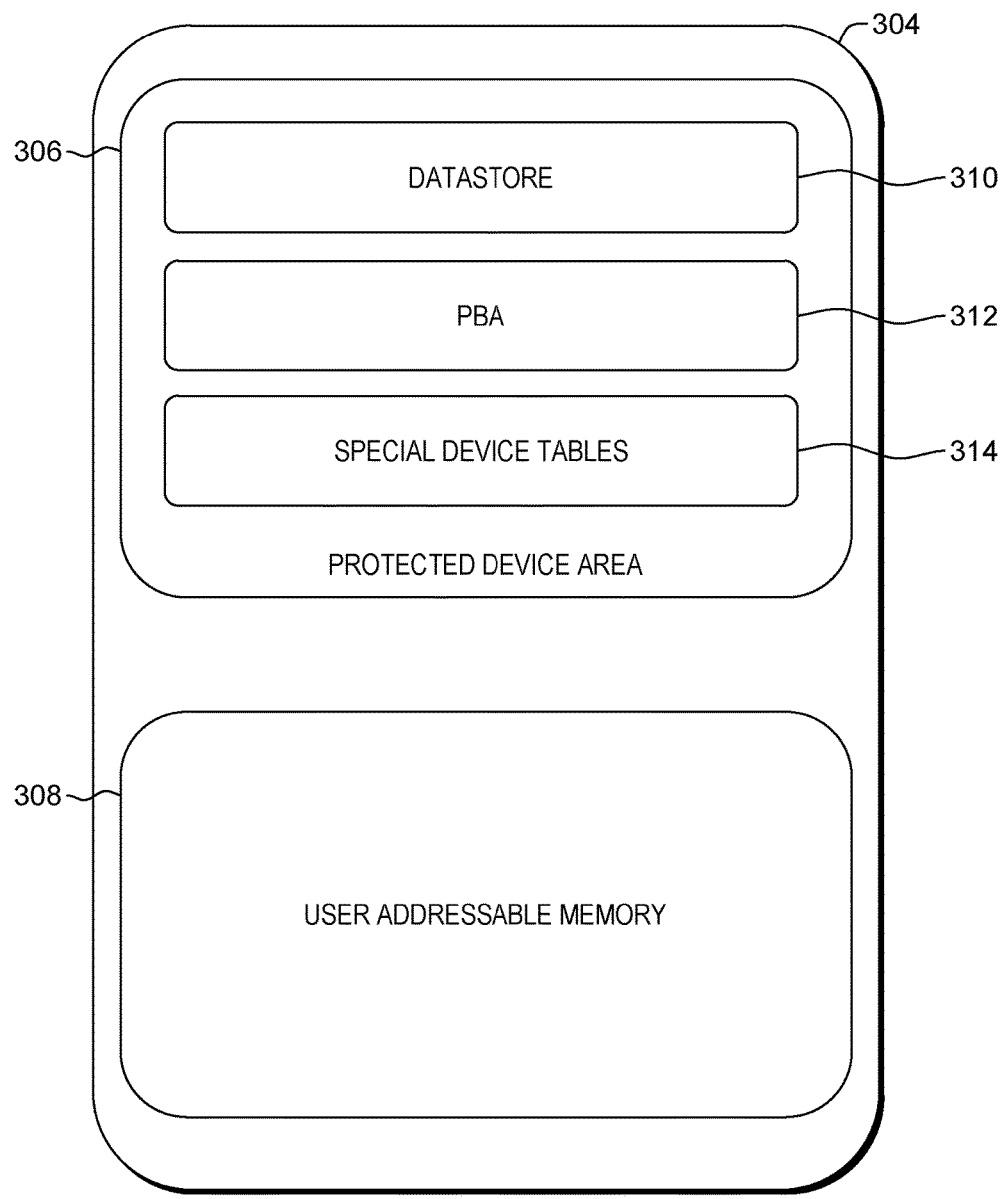
FIG. 3A depicts an example component diagram of a self-encrypting drive.

SEDs have areas in which a hidden partition exists having a raw datastore that is hidden and protected. This protected device area is shown in FIG. 3A, which depicts an example component diagram of a self-encrypting drive. There are two regions depicted within drive 304: protected device area 306 and a user-addressable memory area 308. The protected device area 306 includes a datastore 310, a PBA 312, and area 314 for special tables such as a C_PIN table. The protected device area 306 is not accessible through standard read/write calls to the drive. In order to gain access to this area, appropriate access rights and use of Opal-specified methods are needed. This design helps to prevent tampering with sensitive information because passwords are stored in the C_PIN table and the PBA controls the boot environment. The operating system along with application data, user data, and other data will be stored in the user addressable area 308, and this data can be accessed through standard read/write calls once the drive has been unlocked.

The datastore of the master drive can be partitioned into sections mapped to each user configured for authentication. In one example, the datastore or portion thereof is partitioned into segments of 32 bytes, for instance. The segments can be used to contain usernames, single-letter indications of authentication types, and password complexity information, among other information. This is used in authentication processing for each drive.

For instance, assume that available authentication types are: (i) 'p' for authentication using a password, (ii) 'u' for USB authentication, and (iii) 's' for smartcard. When authenticating to a particular drive, the user can indicate the username and the processing will look in the datastore of the master drive, parse for that username, read the authentication type corresponding to the particular drive for which authentication processing is presently being performed, and perform the corresponding additional processing to acquire the additional authentication information, such as a password, or a key from a smartcard. If the authentication type indicates 'p', the processing will present a password prompt, for instance.

Figure 3B:
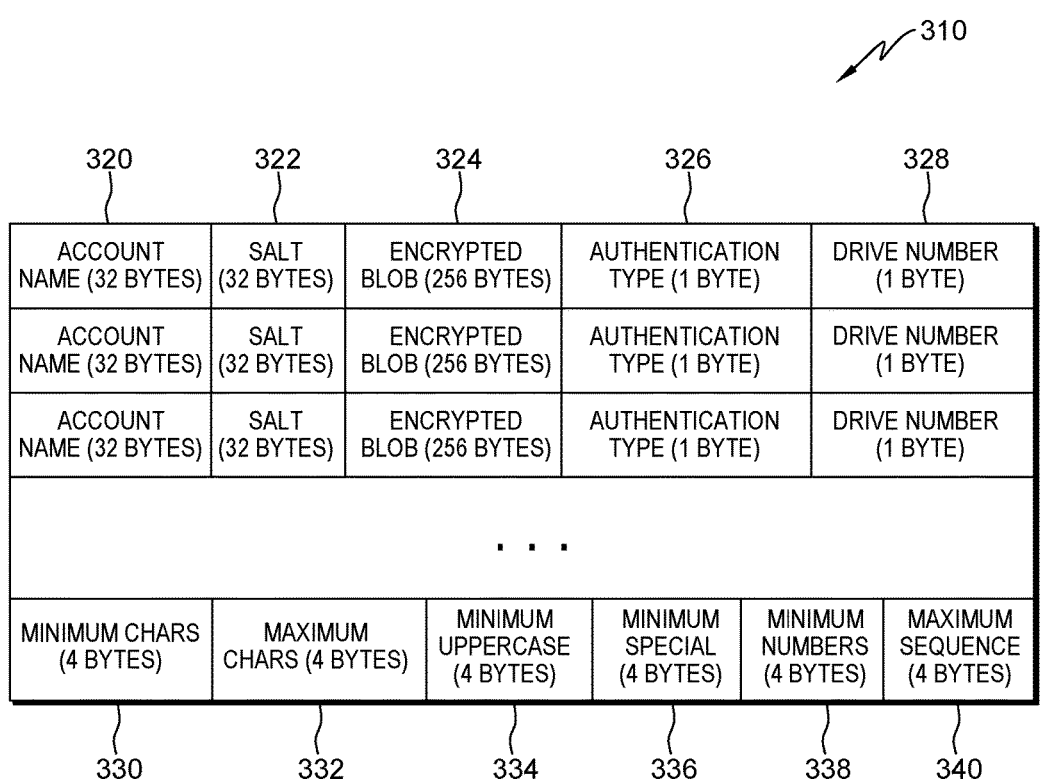
FIG. 3B depicts an example component diagram of a datastore area of a self-encrypting drive, in accordance with aspects described herein.

FIG. 3B depicts an example component diagram of a datastore area of a self-encrypting drive, in accordance with aspects described herein. This details an example design of the partitioning scheme for the datastore. Originally, the datastore is just a byte-addressable storage area, similar to how hard drives or USB drives store data. By partitioning that byte-addressable area in the manner depicted in this example, certain information can be easily extracted based on offsets.

Datastore 310 in FIG. 3B includes several regions as follows:

Account Name 320—Holds an account/user name for a particular authentication. 32 bytes in this example;

Salt 322—An additional input used when hashing, in order to increase security. 32 bytes in this example;

Encrypted Blob 324—Some authentication algorithms can use a random generated blob that gets encrypted. 256 bytes in this example;

Authentication Type 326—A single-letter identification for the type of authentication. 1 byte in this example. Examples could include 'P' for password, 'S' for smartcard, 'U' for USB; and Drive Number 328—The drive number with which the corresponding account name (i.e. at the beginning of the same row) is associated. 1 byte in this example.

The above regions form a single row, which corresponds to a single account. The following several rows include the same categories of information for additional accounts.

Password complexity can also be set using the datastore for when a user creates a password/passphrase authentication. This complexity information can apply to the password ('P') authentication type or the others as well. As an example, the complexity might apply to a password associated with a smartcard ('S') login or to a USB password for a USB ('U') login. The password complexity information is also stored in regions of the datastore 310 as follows:

Minimum Characters 330—Represents the requirement for the minimum number of characters that must be met in each password. 4 bytes in this example;

Maximum Characters 332—Represents the requirement for the maximum number of characters allowed in each password. 4 bytes in this example;

Minimum Uppercase 334—Represents the requirement for the minimum number of uppercase characters that must be met in each password. 4 bytes in this example;

Minimum Special 336—Represents the minimum number of special characters that must be met in each password. 4 bytes in this example;

Minimum Numbers 338—Represents the minimum number of numerical characters that must be met in each password. 4 bytes in this example; and Maximum Sequence 340—Represents the maximum number of repeating characters allowed in each password. 4 bytes in this example.

Whenever a password is created or set by a user, processing will check to see if the requirements are met based on the values (e.g. 330-340) set in the datastore for the password complexity information.

In an example where a user indicates that four SEDs are to be authenticated-to, the user can indicate an authentication type and details for each of the four SEDs, and those may be saved in the datastore of the master drive. This would set values in regions of four rows of the data (using the example of FIG. 3B): an account name, salt and encrypted blob (if applicable), authentication type, and drive number (of the four) for each of the four added authentications.

A table in the datastore that includes this configuration information may be created as part of the configuration from the live CD, and based on the user specifying the drives the user wants to manage and the particular users and authentications types. In some examples, the number of drives involved corresponds to the number of rows used for each user, to store authentication information for that user for each such drive.

It is not necessary that each SED included be aware of this configuration information stored in the datastore of the master SED. However, the table or other data structure storing that configuration information could be replicated to one or more of the other SEDs of the computer system, if desired. This would enable any of the SEDs storing that information to assume the role of master if needed. As will be appreciated, however, duplication of this information, which could be regarded as sensitive, provides a larger attack base to steal that information in order for a malicious actor to attempt unauthorized authenticate to any of the SEDs.

Not only could the datastore of each other drive be overwritten for redundancy/backup purposes, but these other datastores could be utilized for extra storage capacity if necessary, due to the inherent space limitations to the size of the datastore on each drive. In a computer system with 50 SEDs, for instance, the datastore of the master drive may be incapable of holing the authentication information for each of the 50 drives. Thus, that information could be dispersed across the datastores of some or all of the 50 drives, similar to the distribution approach in a RAID-0 setup.

The C_PIN table mentioned above can be stored in the hidden partition on a given SED, for instance in the special device table area 314. Under the Opal Specification, a C_PIN table is placed in a protected area of the SED and stores passwords and other important information. This area where the C_PIN table is stored is designed under the Specification to be secure.

Thus, the C_PIN table can store the actual passwords/passphrases/keys for the authentications applicable to that particular drive, and individual rows of the C_PIN table can map to the individual user authentications In one example, the first row of a C_PIN table of a SED corresponds to an admin account, the second row corresponds to another account, and optionally one or more additional rows correspond to one or more additional user accounts. In operation, and as described in further detail below, the master drive, specifically the processing of the PBA thereof, can be responsible for intaking from a user authentication input such as a password, USB token, or smartcard key as examples. It can then call a trusted command that will attempt to read data, e.g. an unlock key, in an appropriate row of the C_PIN table of a drive and use that unlock key in conjunction with the authentication input to attempt to authenticate with a next drive in the sequence.

As noted, the C_PIN table can contain several rows, each row mapping to a particular account. Typically after creating a new account, such as a first administrator account, the row corresponding to that administrator number, in this case admin1 since it is the first admin to be created, will be populated with the administrator password.

In accordance some embodiments, a dependency chain in the authentication processing of SEDs is created to make authentication more secure. In this aspect, authentication to a given drive requires data from another secure location. A random string is provided in a row of each SED's C_PIN table, and that string is needed to authenticate-to and unlock one or more of the other SEDs. In some examples, the chain is sequential, where in order to authenticate with a next SED in the chain, the immediately preceding SED must be unlocked and the random string obtained therefrom. The random string may be hashed along with an authentication input (key, passphrase, etc.). The dependencies thereby created means that a user is unable to authenticate to a SED without authenticating to one or more prior SEDs.

For the first SED in the chain, the SED acting as the master drive, the random string may be obtained from some other secure source, such as one of the Trusted Platform Module's (TPM) Platform Configuration Registers (PCRs). That PCR value can be obtained based on a measurement of the system, including the BIOS and/or PBA thereof, providing the added benefit that a BIOS attack would likely cause the TPM measurement to fail, prevent the drive(s) from being unlocked. If a measured item has been modified, the correct PCR value will not be provided. Because the base of the dependency chain stems from the TPM, the security of the SEDs are dependent at least in part on the security of the computer system itself.

The key provided based on a safe measurement can be seeded to unlock the master drive, for instance by hashing a user-supplied passphrase and that key. After the master drive is unlocked, the authentication processing to unlock subsequent drives in the sequence can include obtaining an unlock key from the C_PIN table of a current drive and using that in the authentication processing to authenticate to the next drive in the sequence. This is shown in FIG. 4, which depicts an example dependency chain of authentication processing for a plurality of self-encrypting drives of a computer system, in accordance with aspects described herein.

Figure 4:
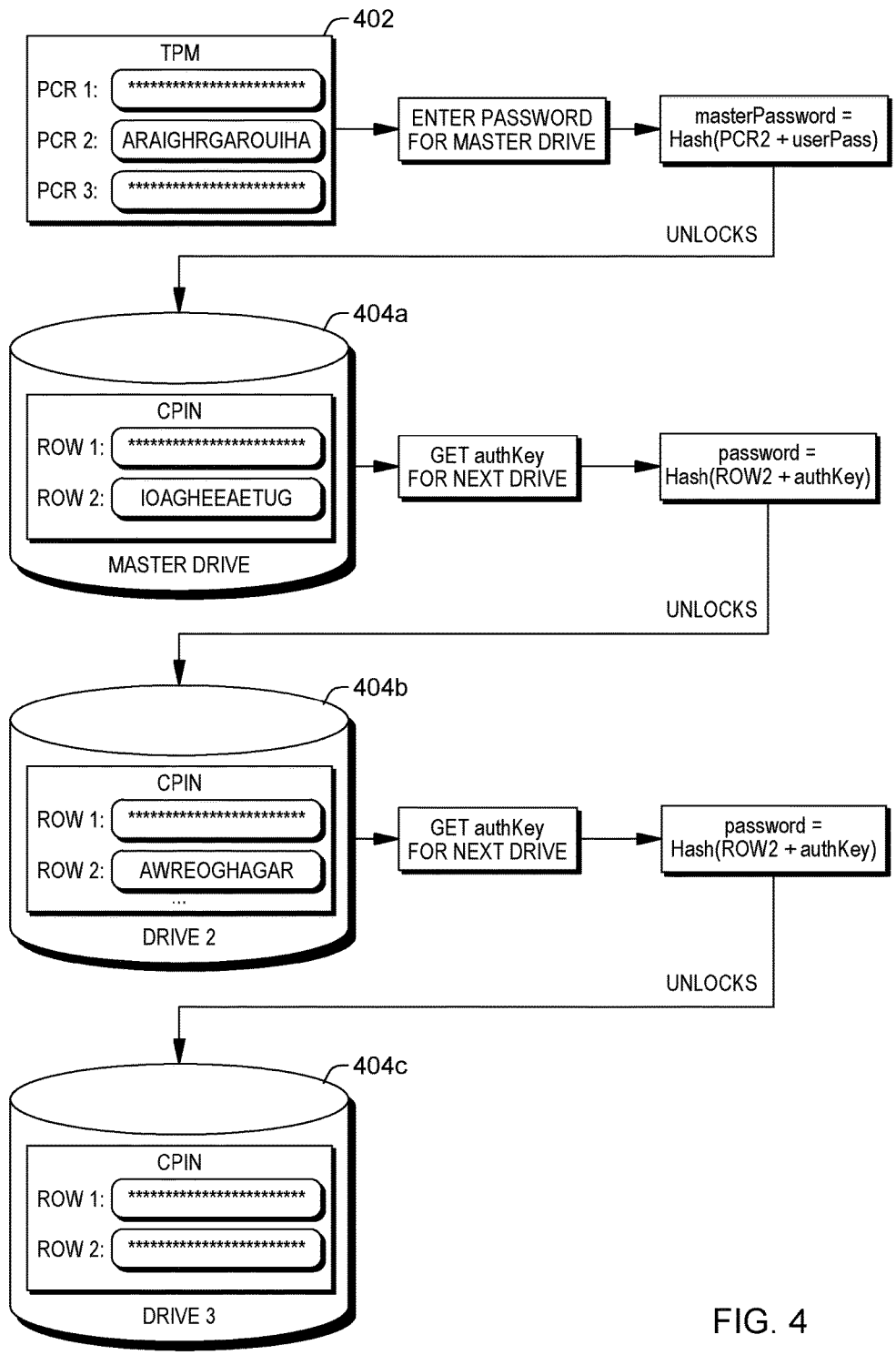
FIG. 4 depicts an example dependency chain of authentication processing for a plurality of self-encrypting drives of a computer system, in accordance with aspects described herein.

Referring to FIG. 4, if the TPM 402 determines that the BIOS is safe, the key/string in PCR 2 is concatenated with a passphrase entered by a user for the master drive, and the masterPassword is determined as a hash of the combined string. The resulting value will be used as the passphrase to unlock first SED 404*a*. Unlocking SED 404*a* provides access to the C_PIN table of drive 404*a*. The unlock key in Row 2 of the C_PIN table is obtained, as is an authentication key (provided by prompting and receiving user input in one example) for authenticating with the next SED (SED 404*b*) in the sequence, and the two are combined and hashed to provide the password for authenticating with second SED 404*b*. This repeats for the third SED 404*c* in the chain.

Thus, once a drive is unlocked, an unlock key that is stored in the protected area such as the second row of the C_PIN table of that drive can be used in conjunction with other authentication input, such as a user passkey, to unlock the next drive. This daisy chaining approach continues through the remaining drives, the number of which is not limited by this approach. Processing the last drive in the chain may not require that a random string be obtained therefrom, because there are no subsequent drives to authenticate.

Optionally, the unlock keys or the full hash/passphrase to unlock a drive may be stored on removable media devices such as a removable thumb drive, to allow data recovery in an event that a sequentially-previous SED of a computer system fails or otherwise is unable to be accessed to obtain the stored unlock key for unlocking a sequentially-subsequent SED.

In some embodiments, and as depicted in the example of FIG. 4, each drive has its own separate password or other authentication option, where an unlock key and additional authentication input from a user, smartcard, key fob, etc. is needed for each drive. This enhances security and enables different authentication options to apply to each drive. The first SED might unlock by way of a password authentication, the second SED by way of smartcard authentication, and third SED by way of USB authentication, as an example. In this manner, each drive can have a discrete authentication method independent of the other authentication methods used for other drives. The necessary authentication processing to obtain the input and unlock the drives can be presented/performed by the PBA of the master drive.

In other embodiments, a single password mode is enabled, in which authentication with the master drive will automatically unlock each of the drives in the sequence. In this situation, each SED still has its own encryption key and unlock key to unlock the drive, the unlock key being provided by another secure storage (e.g. from a TPM or another SED) in the computer system.

Under this single password approach, the C_PIN table of a SED stores an unlock key that unlocks another SED of the system. An unlock key from a drive will be automatically passed as the key to unlock the next drive in the sequence. The step of obtaining separate authentication input for each drive may be eliminated. In some examples, the user can still select an authentication option for the master SED that requires separate input in conjunction with the key obtained from the TPM, such as a smartcard, key fob, or passphrase input, to authenticate with the master. Based on authenticating with the master, the authentication of each subsequent drive can proceed automatically. In this manner, the authentication to the master drive will drive the authentication with the other drives, though each drive still relies on a respective unique key to unlock.

As one enhancement, multiple different user authentications can be configured for one or more of the SEDs to enable different users to unlock a corresponding set of drives. Some users can have administrator privileges with the ability to configure passwords, change authentication complexity, delete users, create users, and other actions. Other users could be standard users having the ability to lock and unlock a drive. The PBA in this aspect, of which the majority of its functionality is unlocked based on authenticating with the master drive, can have role-based authentication. When the user authenticates with the master drive, the user name/account used to authenticate to the master can be the one automatically chosen to authenticate with the remaining drives, in either the multi-input authentication mode or single-input authentication mode described above.

As another enhancement, the PBA can present an interface that allows a user to select which drive(s) to be unlocked. Because the authentication to unlock a selected drive may be dependent on unlocking a drive not selected by the user to be unlocked, in this situation the authentication processing still proceeds through all of the SEDs in the sequence so that the proper unlock key is obtained from a drive even though the drive is to remain locked. Drives that were not selected by the user to be unlocked can be only temporarily unlocked to obtain the unlock key (for a next drive) therefrom. The drive can be re-locked after the key is obtained, for instance immediately thereafter. For drives that the user selected, the drive will remain unlocked.

In some examples, the master SED serves a limited purpose of facilitating authentication processing for the other SEDs and once the target SEDs are unlocked, the master is locked right away. The master SED need not be a drive that stores any user data; it can instead serve the role of providing the PBA and unlocking drives, but otherwise remaining locked, to facilitate security.

As yet another enhancement, aspects can leverage the distress or "revert" capabilities of SEDs. A user can configure a predefined erase passphrase, such as a revert or distress password, for a drive. Inputting the revert password when authenticating to the drive restores the drive to the original factory state, erasing as least some content on the drive, e.g. the encryption key(s) for encrypting/decrypting the data. The TPer Revert feature in the Opal Specification performs this in a single drive case.

This can be extended to the case of multiple SEDs described herein. In the course of performing authentication processing for each drive, if the user supplies the revert password at a given authentication prompt, the system can issue a Revert against that drive to destroy the ability to decrypt encrypted data therefrom. However, the drive that is being reverted may house an unlock key for another drive that is not to be reverted. In that case, the drive can be reverted after first unlocking it and obtaining the unlock key for subsequent use to authenticate to the next drive because unlocking that drive to-be-reverted might necessitate that the user input some authentication input in order to properly authenticate with the drive to unlock it, there are a couple of options for reverting the drive. As one option, upon receiving a revert password for the drive, the authentication processing re-prompts the user to then supply the correct passphrase, used to authenticate to the drive to obtain the unlock key therefrom before reverting the drive. As one example, the authentication processing recognizes that a user has entered the revert password and presents an interface asking the user to re-enter their password. The user can input the correct authentication passphrase at that point, and that is used to briefly unlock the drive, obtain the unlock key for unlocking the next drive, then (optionally) re-locking, and reverting the drive.

As another option, a syntax can be defined that allows a user to type the revert password and correct authentication input at the same time, avoiding a re-prompt. As an example, the syntax is distress:real, where the authentication processing parses the input to detect that the distress password was entered, and a delimiter ':' indicates to the processing separation between the distress password and the correct authentication password. As before, the drive is briefly unlocked, the unlock key for unlocking the next drives is obtained, and the drive is (optionally) re-locked, then reverted.

After processing the drive to be reverted, the authentication processing for the drives continues to the next drive. Additionally, the reverting can be done discretely, i.e. without an explicit indication by the computer system that it was done, so that an unknowing over-the-shoulder observer may not be aware that it happened.

In some examples, such as the single-password approach described above, reverting the master drive will cause the authentication processing to automatically revert all of the drives in the chain.

The predefined erase passphrase need not be limited to the case where the user utilizes a password authentication type. In an authentication type of 'smartcard' or 'smartcard and PIN' the input could be hooked to check whether the predefined erase passphrase is provided by the smartcard or as part of the user's PIN input. This would also work with a 'smartcard with PIN and password' authentication type, or the erase passphrase may be expected as the input password entered as part of this authentication type.

In some embodiments, a revert/wipe drive option is presented by the PBA when the PBA is booted after authenticating to the master SED. This enables a user to specify one or more drives to revert, and may or may not require that the user enter the predefined erase passphrase.

Another authentication type along with password, smartcard, USB key, and others, is double-password entry in which two passwords are expected and needed for authenticating to a drive. In some examples, this authentication type is modified to support a revert password entry, where reversion of a drive is triggered if either entered password is the predefined erase passphrase.

Figure 5A:
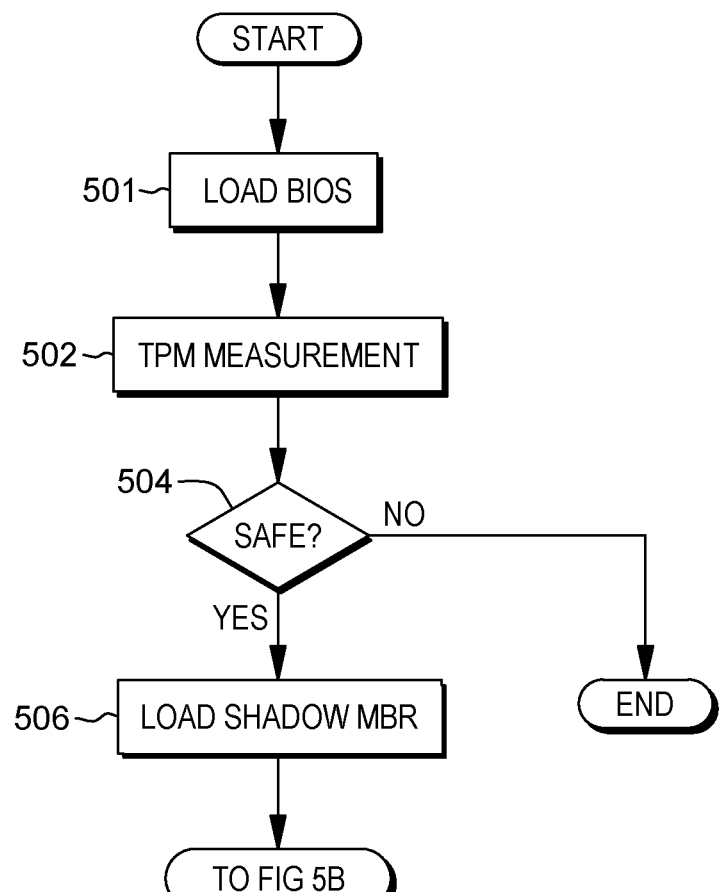
FIGS. 5A and 5B depict an example method of authentication processing for a plurality of self-encrypting drives of a computer system, in accordance with aspects described herein.
Figure 5B:
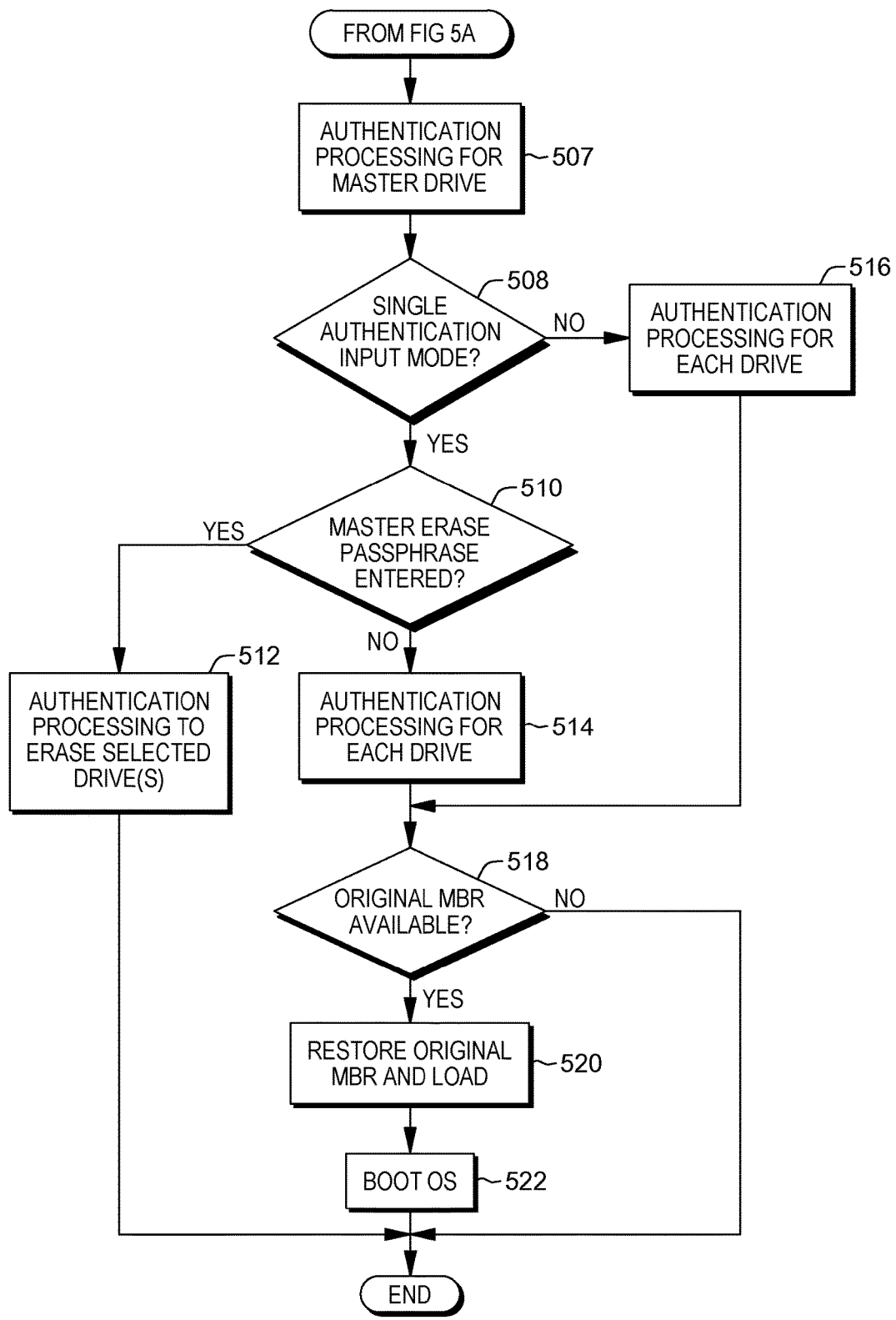

In accordance with aspects described herein, authentication processing for a plurality of self-encrypting drives of a computer system is provided, an example of which is described and depicted with reference to FIGS. 5A-5B. In some examples, the processing is performed at least in part by a PBA of the master SED, and may be performed by one or more other components of the computer system.

The process begins based on system startup or restart, as examples, with loading the BIOS (501). The BIOS looks for a master boot record (MBR) and instead of finding the original MBR will find the shadow MBR provided by the PBA but will not let load the PBA, which remains substantially locked at that point. Then, a TPM measurement (502) is taken. The TPM performs a measurement for tampering, for instance to check whether boot/loadtime components such as the BIOS, the original MBR, and/or the PBA have been tampered-with. It is determined at 504 whether the computer system is deemed safe. If not, the process ends, for instance with a fault, error, and/or reboot. In this manner, if the BIOS and/or other component(s) checked as part of the TPM measurement were compromised, access to data, including user data of the master SED, will remain locked and the operating system will fail to load. Based on the dependency chain among the SEDs of the system, data of any SED for which authentication is dependent on authenticating with and unlocking the master drive will also be inaccessible.

If the TPM measurement indicates that the system is safe, the shadow MBR provided by the PBA is then loaded to shadow the original MBR (506) and (potentially) load the custom PBA environment, if authentication with the master is successful. Thus, processing continues to FIG. 5B by initially performing authentication processing for the master SED (507). Further details of this authentication processing are described below with reference to FIG. 6. Generally, the appropriate authentication method that is configured for the master drive is performed, for instance to prompt the user to enter a username and provide any other necessary authentication input. Authentication information is obtained for the master SED, and authentication processing for the master SED is performed based on that obtained authentication information. As described above, part of this authentication processing for the master SED may be to use information obtained from the TPM based on the TPM's measurement of the system. In this case, the authentication information for the master SED includes both user authentication input such as a username/password and the measurement data obtained based on the measurement of the computer system, and the authentication processing for the master SED includes attempting to unlock the master SED using that measurement data and user authentication input.

If authentication with the master drive fails, for instance an incorrect username or incorrect passphrase is entered, processing ends, optionally by initiating a reboot of the computer system.

Assuming that authentication processing for the master SED succeeds, the PBA is unlocked and loaded to facilitate additional processing accordingly for one or more additional SEDs in the computer system. In some embodiments, the user is presented with an interface that allows the user to select which SEDs are to be involved in authentication processing. This may be presented prior to, or after, authenticating with the master SED. The interface may additionally or alternatively allow the user to select one or more drives to revert/erase as part of the processing. Furthermore, the selection of applicable SEDs might be automatic based on preconfiguration of different user accounts/names used to authenticate with the master SED. In this regard, a given user may have permissions to unlock only a subset of SEDs in the system. If that user initially authenticates to the master SED, the particular set of SEDs to be unlocked or presented to the user for selection to unlock may be limited according to which SEDs the user is entitled to unlock.

The performance of the authentication processing for the other SEDs in the computer system is based on the authentication processing that occurs for the master drive. If the master drive is not authenticated, then the authentication processing of the others will refrain from enabling any authentication with those SEDs in the first place, since the master would not be unlocked to obtain the necessary unlock key(s) therefrom. Otherwise, if the master is successfully authenticated-to, then the authentication processing for the other SEDs will proceed based on this, using an unlock key obtained from the master, and in accordance with an authentication mode and any selections that the user has made. In the example of FIG. 5B, there are two authentication modes possible for authenticating to the SEDs of the computer system: a single authentication input mode or a multi-authentication input mode. The single input mode enables the user to authenticate with only the master SED and drive authentication processing for the additional SEDs, for instance to automatically unlock other SEDs in the system. On the other hand, a multi-input approach has the user authenticate into each drive separately.

Continuing with FIG. 5B, it is determined whether the processing is operating in single authentication input mode (508). The mode chosen may be preconfigured for the system, or may be specified by a user on boot or after authenticating with the master SED, as examples.

If at 508 it is determined that processing is operating in single authentication input mode, it is determined at 510 whether a master erase passphrase was entered. In this regard, the user, as part of the authentication with the master SED, may have supplied a predetermined erase passphrase. In single authentication input mode, supply of this erase passphrase causes each of the drives in the system to be automatically seamlessly wiped, making this ideal in an emergency situation. The authentication processing involved in erasing each drive is described with reference to FIG. 6. It is noted that the SEDs that are actually erased may be limited to ones that the user initially selected for authentication processing, if such a selection was made by the user. Thus, at 512, the processing proceeds by performing authentication processing to erase selected drive(s).

If instead it is determined at 510 that the master erase passphrase was not entered, then processing continues by performing authentication processing for each drive (514), which is described with reference to FIG. 6.

Referring back to 508, if it is instead determined that processing is not operating in single authentication input mode, the authentication processing is proceeding in multi-input mode. Accordingly, processing continues by performing authentication processing for each SED (516) according to processing described below with reference to FIG. 7.

After authentication processing is performed for each SED (514, 516), the process proceeds by checking whether the original MBR is available. Since the PBA shadows the original MBR, the original MBR is not called on until the PBA passes processing to it. If the original MBR is not available, the process ends with an error, fault, and/or reboot. Otherwise, the original MBR is restored and loaded (520) and the operating system (OS) is booted (522) from whichever disk houses the OS, as indicated by the original MBR. As that point, the applicable SEDs will have been unlocked and ready for OS use. Performing the authentication processing for the plurality of SEDs might unlock two or more SEDs, where these SEDs are unlocked for use by the operating system.

Figure 6:
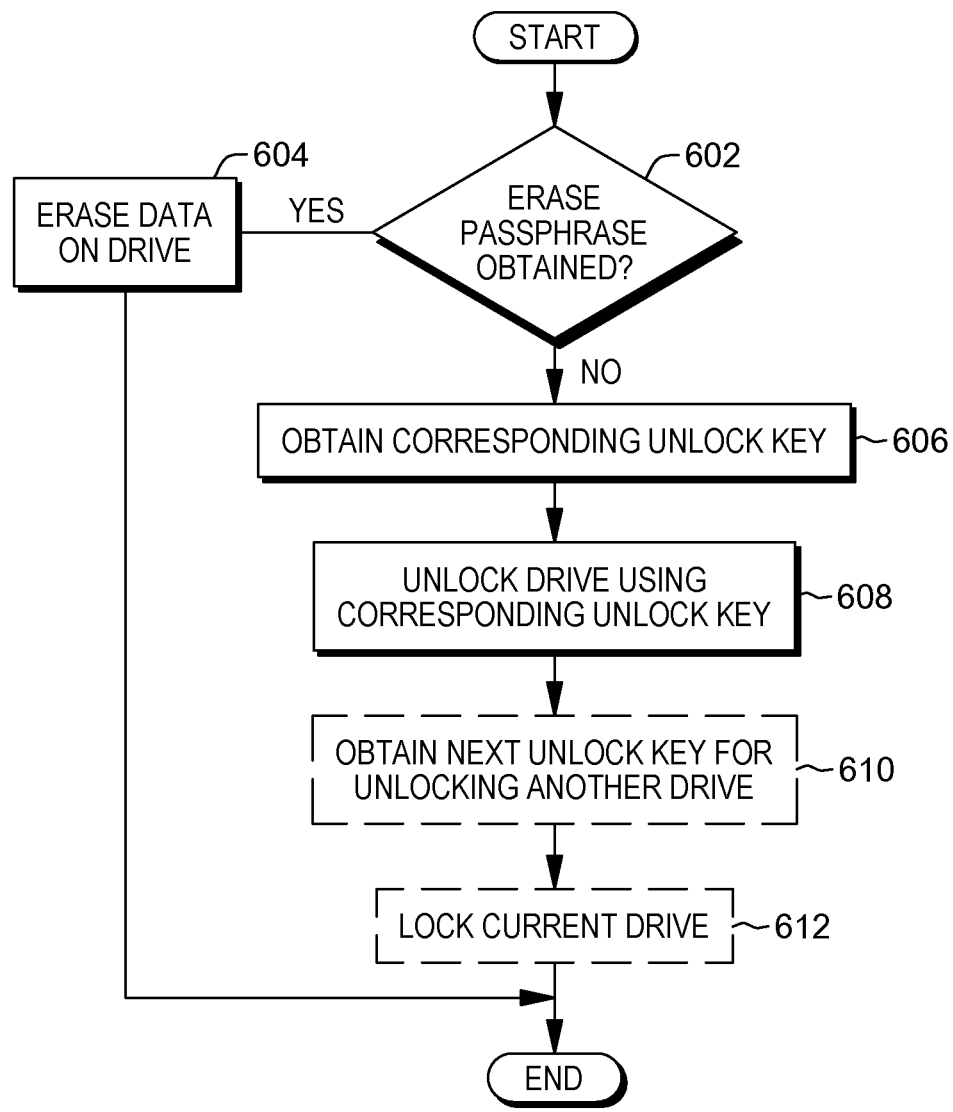
FIG. 6 depicts an example method of authentication processing for a self-encrypting drive, in accordance with aspects described herein.

FIG. 6 depicts an example method of authentication processing for a self-encrypting drive, in accordance with aspects described herein. The authentication processing of FIG. 6 is performed for authenticating with a master SED, for instance, and/or in the single authentication input mode for each SED of the computer system. Aspects of FIG. 6 are performed by executing program instructions, such as program instructions of a PBA and/or other pre-boot facility, as an example.

Initially, it is determined whether the authentication information (input by a user) includes an erase passphrase (602). If so, the process erases data on the SED (604). As an example, a revert facility is invoked to erase some data in a protected area of the SED, for example to erase one or more cryptographic keys or other data that enables the user data of the SED to be read/written. Based on erasing the data of the SED, the process ends. This process may be re-invoked for each SED of the computer system.

In performing this processing for a master SED, if the authentication information includes the predefined erase passphrase, data from the master SED is erased and the authentication processing for each additional SED includes determining that the erase passphrase was obtained, i.e. as part of the master SED authentication, and erasing data from the additional SED.

Referring back to 602, if instead it is determined that the erase passphrase was not obtained, then the unlock key corresponding to the SED being processed is obtained (606) and the drive is unlocked using that corresponding unlock key. In the processing for the master SED, the unlock key may be the PCR value from the TPM, any authentication input from the user to authenticate to the master SED, or a combination of the two. In the processing of FIG. 6 for any of the remaining SEDs (again keeping in mind that such FIG. 6 processing for the remaining SEDs is done in the single authentication input mode), the unlock key obtained for the drive currently being processed is obtained from another SED that was previously unlocked, for instance the immediately preceding SED in the sequence.

The processing then unlocks the drive using the corresponding unlock key (608). Then, optional processing is performed to obtain a next unlock key for unlocking another SED (610). This is performed when at least one next SED is to be processed. If the current SED is the last SED in the sequence, then there is no need to obtain an unlock key from it, as it may not store any unlock key at all.

Additionally, processing continues by optionally locking the current SED (612). This is performed in the case that only some of the SEDs in the system are to be unlocked. In this case, a SED may be processed and unlocked in order to obtain the unlock key therefrom, e.g. to unlock the next SED in the sequence, then immediately locked once the unlock key is obtained.

In this manner, the unlock key corresponding to an additional SED beyond the master may be obtained from another unlocked SED of the plurality of SEDs of the computer system. The authentication processing for each such additional SED can include: automatically unlocking the additional SED using the unlock key, and then obtaining from the unlocked additional SED a next unlock key for use in authentication processing for a next SED of the sequence. This processing can proceed iteratively through a sequence of multiple additional SEDs, where the unlock key corresponding to one SED is obtained from an unlocked SED immediately preceding that one SED in the sequence.

Figure 7:
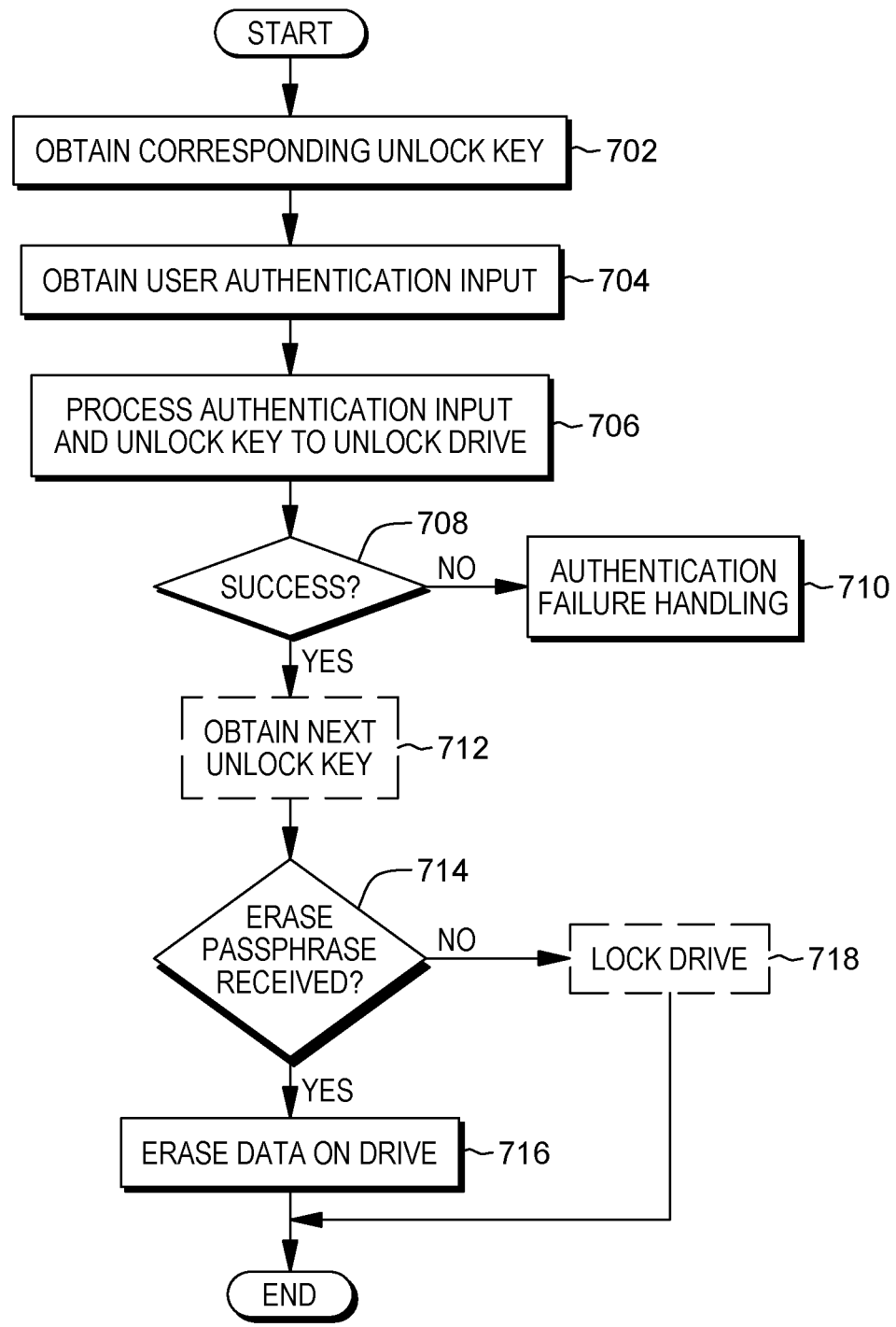
FIG. 7 depicts another example method of authentication processing for a self-encrypting drive, in accordance with aspects described herein.

FIG. 7 depicts another example method of authentication processing for a self-encrypting drive, in accordance with aspects described herein. The authentication processing of FIG. 7 may be used in the multi-authentication input mode, where an independent authentication, i.e. the processing of FIG. 7, is performed for each SED. Aspects of FIG. 7 are performed by executing program instructions of a PBA, as an example. The process begins by obtaining the unlock key corresponding to the SED currently being processed (702). As described above, the unlock key can come from another SED, such as one that was already unlocked sequentially prior to the SED currently being processed. In some examples, the unlock key is obtained from the immediately preceding SED in the sequence.

The process then obtains user authentication input (704) for the SED being processed. The particular input can vary according to the authentication type that is configured for the drive and the user involved. If the authentication type is smartcard, the input may include data from the smartcard, perhaps in conjunction with a PIN and/or password from the user. If the authentication type is password, the authentication input includes an input passphrase from the user. The authentication input and the unlock key are then processed in an attempt to unlock the drive (706). In some examples, this processing includes hashing a value formed from a combination of at least some of the authentication input and the unlock key. In some examples, the authentication input is or includes an erase passphrase. In this situation, the user may be presented with additional prompt(s) for the user to provide the correct authentication credentials. This may be done so that the drive can be unlocked (to obtain a next unlock key) before reverting the drive.

Processing continues by determining whether the authentication attempt is successful (708), and if not, the process proceeds with authentication failure handling (710). As examples, a fault, retry, or abort is initiated. Otherwise, authentication was successful and the SED was unlocked. As with the processing of FIG. 6 in the single-input mode, optional processing is performed to obtain a next unlock key for unlocking another SED (712). This is performed when at least one next SED is to be processed based on the unlock key housed in the current drive. If the current SED is the last SED in the sequence, then there is no need to obtain an unlock key from it.

The processing continues with a check as to whether the erase passphrase for this particular SED was received (714). As described above, as part of authenticating with the drive, the user may have provided the erase passphrase to indicate that an erase of at least some drive content is to be effected, e.g. through a revert operation. If the erase passphrase is entered during the multi-input mode, only the drive for which the erase passphrase was provided will be wiped. In this case, if the user desires to erase each drive, the user will enter the appropriate passphrase for each drive.

Accordingly, the authentication processing for a SED for which some data is to be erased includes, prior to erasing the data thereon, using at least some of the authentication input to unlock the SED (i.e. 706) and obtain therefrom an unlock key corresponding to another SED, where that unlock key is for use in the authentication processing for the another SED. This is done prior to the erasure to ensure that the unlock key is obtained first, then the data is erased. If the erase passphrase was received, the process erases data on the drive (716) and the process ends. Otherwise, processing continues by optionally locking the current SED (718), performed in the case that this particular SED is not selected to be unlocked.

After the process ends, the authentication processing for the plurality of SEDs continues with authentication processing for the next SED in the sequence, if any SEDs are left to process.

Figure 8:
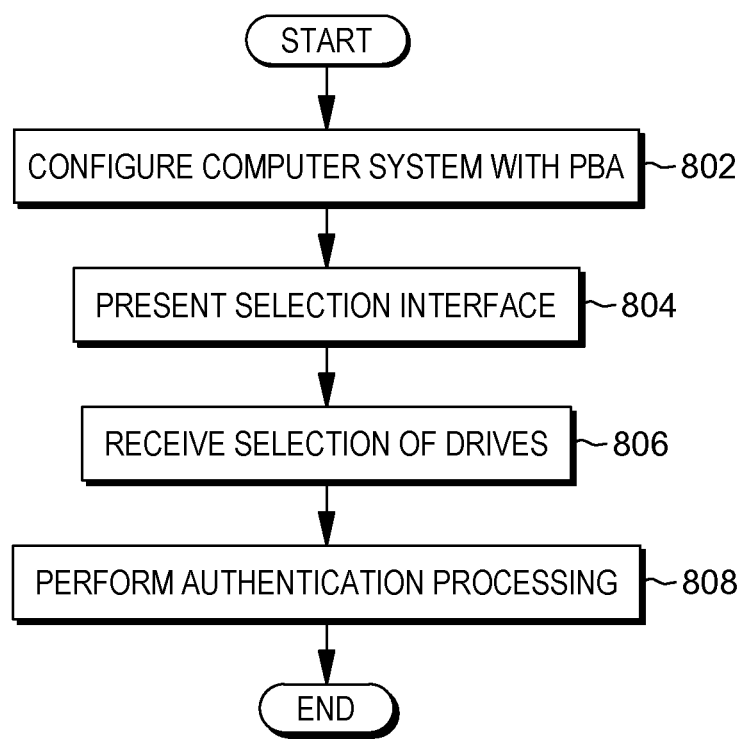
FIG. 8 depicts an example process to facilitate selective unlocking of self-encrypting drives of a computer system, in accordance with aspects described herein.

FIG. 8 depicts an example process to facilitate selective unlocking of self-encrypting drives of a computer system, in accordance with aspects described herein. Initially, the computer system is configured with a pre-boot authentication environment (802), such as described above with reference to FIG. 2. The PBA can include program instructions stored on the master SED for execution to perform the authentication processing for a plurality of SEDs of the computer system, and the configuring the computer system with the PBA can include obtaining configuration information from a user, the configuration information indicating authentication type(s) for use with the plurality of SEDs, and then writing that PBA, configured to utilize the authentication type(s), to the master SED.

At some point after the system is configured with the PBA, based on some event such as power-on of the computer system, the process presents a selection interface to the user indicating the plurality of SEDs of the computer system (804). Based on input by the user to that selection interface, a selection is received (806) indicating one or more SEDs, of those plurality of SEDs of the system, that the user desires to unlock and/or erase. Then, authentication processing is performed for the plurality of SEDs. It is noted that in some examples, even though a particular SED was not selected to be unlocked or erased, authentication processing for that SED is nevertheless performed, for instance where that SED stores an unlock key that is needed to unlock another SED that was selected to be unlocked. Thus, as a particular example, assume that at least one of the SEDs is not part of the selection. In this example, for each SED of the one or more SEDs indicated by the selection to be unlocked or erased, the authentication processing for the SED includes (i) unlocking the SED for use after a boot of the computer system and/or (ii) erasing at least some data from the self-encrypting storage device. For each SED of the at least one SED not part of the selection, the authentication processing for the SED includes temporarily unlocking the SED to obtain an unlock key for use in authentication processing for a next SED, and locking the SED based on obtaining the unlock key.

Figure 9:
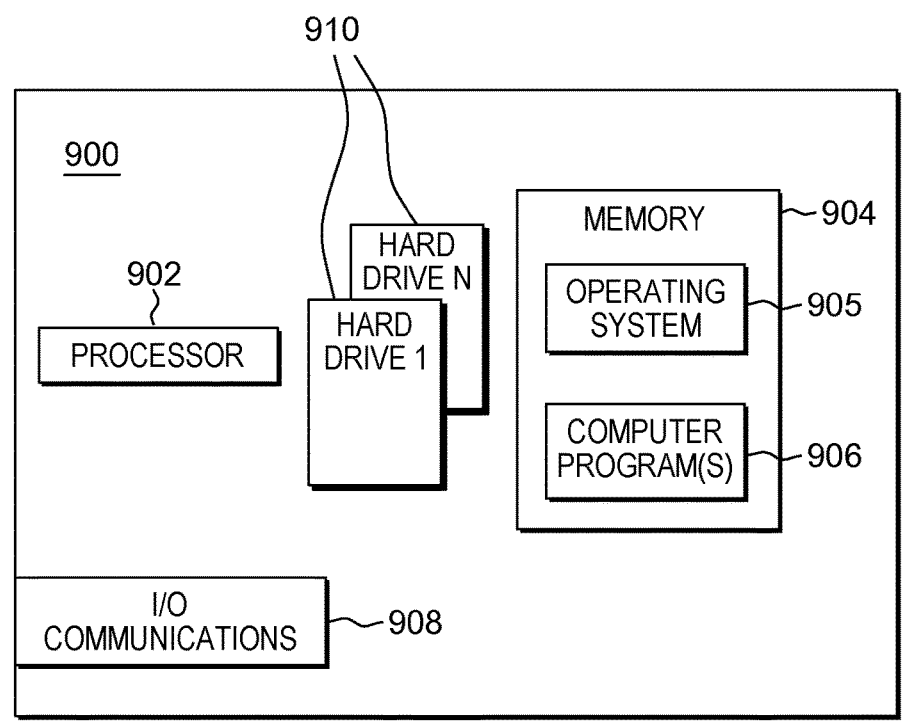
FIG. 9 depicts an example computer system to incorporate and/or use aspects described herein.

Aspects described provide the ability for a single computer system to include and utilize multiple self-encrypting storage devices, such as SEDs, enabling users to authenticate-to and unlock each of these drives for use. FIG. 9 depicts an example computer system to incorporate and/or use aspects described herein. Computer system 900 includes a processor 902 and memory 904. Processor 902 includes any appropriate hardware component(s) capable of executing one or more instructions from memory 904. Memory 904 includes an operating system 905 and computer program(s) 906 that are loaded from one or more hard drives 910, a plurality of which are self-encrypting storage devices, such as self-encrypting drives.

Further, computer system 900 includes an input/output (I/O) communications interface component 908 for communicating data between computer system 900 and external devices, such as I/O and peripheral devices (mouse, keyboard, display, optical devices) and network devices, as examples.

In some embodiments, aspects described herein may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may comprise a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to comprise a tangible medium that can contain or store program code for use by or in connection with an instruction execution system, apparatus, or device, such as a processor. The program code stored in/on the computer readable medium therefore produces an article of manufacture (such as a "computer program product") including program code.

Figure 10:
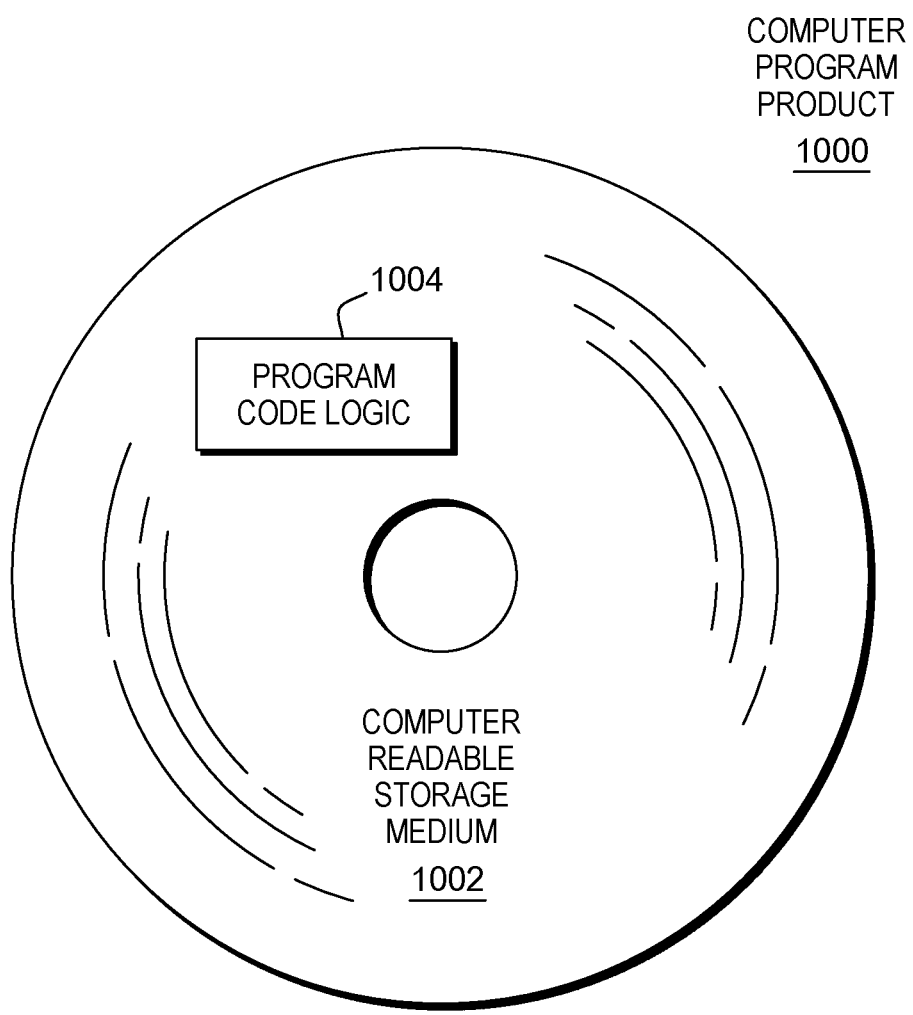
FIG. 10 depicts an embodiment of a computer program product incorporating aspects described herein.

Referring now to FIG. 10, in one example, a computer program product 1000 includes, for instance, one or more computer readable media 1002 to store computer readable program code means or logic 1004 thereon to provide and facilitate one or more aspects of the present invention.

Program code contained or stored in/on a computer readable medium can be obtained and executed by a computer system (computer, computer system, etc. including a component thereof) and/or other devices to cause the computer system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects of the present invention may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more computer system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the Figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram may represent a module, segment, or portion of code, which comprises one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    performing authentication processing for a plurality of self-encrypting storage devices of a computer system to unlock the plurality of self-encrypting storage devices using a plurality of different unlock keys, the authentication processing for the plurality of self-encrypting storage devices comprising:
        obtaining authentication information for one self-encrypting storage device of the plurality of self-encrypting storage devices;
        performing authentication processing for the one self-encrypting storage device based on the obtained authentication information for the one self-encrypting storage device; and
        based on the authentication processing for the one self-encrypting storage device, performing authentication processing for each additional self-encrypting storage device of one or more additional self-encrypting storage devices of the plurality of self-encrypting storage devices, wherein the authentication processing for the plurality of self-encrypting storage devices sequentially unlocks the plurality of self-encrypting storage devices using the plurality of different unlock keys, wherein an unlock key corresponding to a sequentially-subsequent self-encrypting storage device is obtained based on unlocking a sequentially-previous self-encrypting storage device and obtaining, from the sequentially-previous self-encrypting storage device, the unlock key corresponding to the sequentially-subsequent self-encrypting storage device.

2. The method of claim 1, wherein the obtaining authentication information for the one self-encrypting storage device comprises obtaining, as the authentication information, at least one user authentication input and measurement data, the measurement data obtained based on a measurement of the computer system, and wherein the authentication processing for the one self-encrypting storage device comprises attempting to unlock the one self-encrypting storage device using the obtained measurement data and user authentication input.

3. The method of claim 1, wherein the authentication processing for the one self-encrypting storage device comprises:
    determining whether the authentication information comprises a predefined erase passphrase; and
    based on determining that the authentication information comprises the predefined erase passphrase, erasing at least some data from the one self-encrypting storage device.

4. The method of claim 3, wherein the authentication processing for each additional self-encrypting storage device comprises erasing at least some data from the additional self-encrypting storage device.

5. The method of claim 1, wherein the authentication processing for the one self-encrypting storage device comprises unlocking the one self-encrypting storage device, and wherein the authentication processing for each additional self-encrypting storage device comprises unlocking the additional self-encrypting storage device using an unlock key, of the plurality of different unlock keys, corresponding to the additional self-encrypting storage device.

6. The method of claim 5, wherein the authentication processing for each additional self-encrypting storage device of at least one additional self-encrypting storage device of the one or more additional self-encrypting storage devices further comprises:
obtaining, from a user, authentication input corresponding to the additional self-encrypting storage device; and
processing the authentication input in conjunction with the unlock key corresponding to the additional self-encrypting storage device to determine whether to unlock the additional self-encrypting storage device.

7. The method of claim 5, wherein the authentication processing for each additional self-encrypting storage device of at least one additional self-encrypting storage device of the one or more additional self-encrypting storage devices further comprises:
obtaining from a user, authentication input corresponding to the additional self-encrypting storage device;
determining whether the authentication input comprises a predefined erase passphrase; and
based on determining that the authentication input comprises the predefined erase passphrase, erasing at least some data from the additional self-encrypting storage device.

8. The method of claim 7, wherein the authentication processing for each additional self-encrypting storage device of the at least one additional self-encrypting storage device further comprises, prior to erasing the at least some data:
using at least some of the authentication input to unlock the additional self-encrypting storage device and obtain therefrom an unlock key corresponding to another self-encrypting storage device of the one or more additional self-encrypting storage devices, the unlock key for use in the authentication processing for the another self-encrypting storage device; and
proceeding with the erasing the at least some data.

9. The method of claim 1, further comprising, based on performing the authentication processing for the plurality of self-encrypting storage devices, initiating a boot of the computer system to an operating system, wherein the plurality of self-encrypting storage devices are unlocked for use by the operating system.

10. The method of claim 1, further comprising, based on a power-on of the computer system:
presenting a selection interface indicating the plurality of self-encrypting storage devices of the computer system;
receiving, based on input to the selection interface, a selection indicating one or more self-encrypting storage devices of the plurality of self-encrypting storage devices, wherein at least one self-encrypting storage device of the plurality of self-encrypting storage devices is not part of the selection; and
performing the authentication processing for the plurality of self-encrypting storage devices, wherein:
for each self-encrypting storage device of the one or more self-encrypting storage devices indicated by the selection, the authentication processing for the self-encrypting storage device comprises (i) unlocking the self-encrypting storage device for use after a boot of the computer system or (ii) erasing at least some data from the self-encrypting storage device; and
for each self-encrypting storage device of the at least one self-encrypting storage device not part of the selection, the authentication processing for the self-encrypting storage device comprises temporarily unlocking the self-encrypting storage device to obtain an unlock key for use in authentication processing for a next self-encrypting drive, and locking the self-encrypting storage device based on obtaining the unlock key.

11. The method of claim 1, further comprising configuring the computer system with a pre-boot authentication environment, the pre-boot authentication environment comprising program instructions stored on the one self-encrypting storage device for execution to perform the authentication processing for a plurality of self-encrypting storage devices of a computer system, wherein the configuring the computer system with the pre-boot authentication environment comprises:
obtaining from a user configuration information indicating one or more authentication types for use with the plurality of self-encrypting storage devices; and
writing the pre-boot authentication environment, configured to utilize the one or more authentication types, to the one self-encrypting storage device.

12. A computer program product comprising:
a non-transitory computer-readable storage medium comprising program instructions for execution by a processor to perform a method comprising:
performing authentication processing for a plurality of self-encrypting storage devices of a computer system to unlock the plurality of self-encrypting storage devices using a plurality of different unlock keys, the authentication processing for the plurality of self-encrypting storage devices comprising:
obtaining authentication information for one self-encrypting storage device of the plurality of self-encrypting storage devices;
performing authentication processing for the one self-encrypting storage device based on the obtained authentication information for the one self-encrypting storage device; and
based on the authentication processing for the one self-encrypting storage device, performing authentication processing for each additional self-encrypting storage device of one or more additional self-encrypting storage devices of the plurality of self-encrypting storage devices, wherein the authentication processing for the plurality of self-encrypting storage devices sequentially unlocks the plurality of self-encrypting storage devices using the plurality of different unlock keys, wherein an unlock key corresponding to a sequentially-subsequent self-encrypting storage device is obtained based on unlocking a sequentially-previous self-encrypting storage device and obtaining, from the sequentially-previous self-encrypting storage device, the unlock key corresponding to the sequentially-subsequent self-encrypting storage device.

13. The computer program product of claim 12, wherein the authentication processing for the one self-encrypting storage device comprises:
determining whether the authentication information comprises a predefined erase passphrase; and based on determining that the authentication information comprises the predefined erase passphrase, erasing at least some data from the one self-encrypting storage device, and wherein the authentication processing for each additional self-encrypting storage device comprises erasing at least some data from the additional self-encrypting storage device.

14. The computer program product of claim 12, wherein the authentication processing for the one self-encrypting storage device comprises unlocking the one self-encrypting storage device, and wherein the authentication processing for each additional self-encrypting storage device comprises unlocking the additional self-encrypting storage device using an unlock key, of the plurality of different unlock keys, corresponding to the additional self-encrypting storage device.

15. The computer program product of claim 14, wherein the authentication processing for each additional self-encrypting storage device of at least one additional self-encrypting storage device of the one or more additional self-encrypting storage devices further comprises:
- obtaining from a user, authentication input corresponding to the additional self-encrypting storage device;
- determining whether the authentication input comprises a predefined erase passphrase; and
- based on determining that the authentication input comprises the predefined erase passphrase, erasing at least some data from the additional self-encrypting storage device.

16. The computer program product of claim 12, wherein the method further comprises:
- presenting a selection interface indicating the plurality of self-encrypting storage devices of the computer system;
- receiving, based on input to the selection interface, a selection indicating one or more self-encrypting storage devices of the plurality of self-encrypting storage devices, wherein at least one self-encrypting storage device of the plurality of self-encrypting storage devices is not part of the selection; and
- performing the authentication processing for the plurality of self-encrypting storage devices, wherein:
  - for each self-encrypting storage device of the one or more self-encrypting storage devices indicated by the selection, the authentication processing for the self-encrypting storage device comprises (i) unlocking the self-encrypting storage device for use after a boot of the computer system or (ii) erasing at least some data from the self-encrypting storage device; and
  - for each self-encrypting storage device of the at least one self-encrypting storage device not part of the selection, the authentication processing for the self-encrypting storage device comprises temporarily unlocking the self-encrypting storage device to obtain an unlock key for use in authentication processing for a next self-encrypting drive, and locking the self-encrypting storage device based on obtaining the unlock key.

17. A computer system configured to perform a method comprising:
- performing authentication processing for a plurality of self-encrypting storage devices of a computer system to unlock the plurality of self-encrypting storage devices using a plurality of different unlock keys, the authentication processing for the plurality of self-encrypting storage devices comprising:
  - obtaining authentication information for one self-encrypting storage device of the plurality of self-encrypting storage devices;
  - performing authentication processing for the one self-encrypting storage device based on the obtained authentication information for the one self-encrypting storage device; and
  - based on the authentication processing for the one self-encrypting storage device, performing authentication processing for each additional self-encrypting storage device of one or more additional self-encrypting storage devices of the plurality of self-encrypting storage devices, wherein the authentication processing for the plurality of self-encrypting storage devices sequentially unlocks the plurality of self-encrypting storage devices using the plurality of different unlock keys, wherein an unlock key corresponding to a sequentially-subsequent self-encrypting storage device is obtained based on unlocking a sequentially-previous self-encrypting storage device and obtaining, from the sequentially-previous self-encrypting storage device, the unlock key corresponding to the sequentially-subsequent self-encrypting storage device.

18. The computer system of claim 17, wherein the authentication processing for the one self-encrypting storage device comprises unlocking the one self-encrypting storage device, and wherein the authentication processing for each additional self-encrypting storage device comprises unlocking the additional self-encrypting storage device using an unlock key, of the plurality of different unlock keys, corresponding to the additional self-encrypting storage device.

* * * * *